US010304011B2

(12) United States Patent
Park et al.

(10) Patent No.: US 10,304,011 B2
(45) Date of Patent: May 28, 2019

(54) ELECTRONIC SHELF LABEL SYSTEM AND COMMUNICATIONS METHOD THEREOF

(71) Applicant: SOLUM CO., LTD., Suwon-Si, Gyeonggi-Do (KR)

(72) Inventors: Young Seo Park, Suwon-Si (KR); Won Hyo Jeong, Suwon-Si (KR)

(73) Assignee: SOLUM CO., LTD., Yongin-si (KR)

( * ) Notice: Subject to any disclaimer, the term of this patent is extended or adjusted under 35 U.S.C. 154(b) by 879 days.

(21) Appl. No.: 14/290,508

(22) Filed: May 29, 2014

(65) Prior Publication Data

US 2015/0178643 A1 Jun. 25, 2015

(30) Foreign Application Priority Data

Dec. 20, 2013 (KR) ........................ 10-2013-0160632

(51) Int. Cl.
*G06Q 10/02* (2012.01)
*G06Q 30/06* (2012.01)

(52) U.S. Cl.
CPC ......... *G06Q 10/02* (2013.01); *G06Q 30/0641* (2013.01)

(58) Field of Classification Search
None
See application file for complete search history.

(56) References Cited

U.S. PATENT DOCUMENTS

| 5,898,383 | A | 4/1999 | Forsythe | |
|---|---|---|---|---|
| 6,253,190 | B1* | 6/2001 | Sutherland | G06F 3/147 235/383 |
| 7,490,054 | B2* | 2/2009 | Reade | G06Q 20/20 705/16 |
| 8,403,215 | B2 | 3/2013 | Aihara et al. | |
| 8,818,851 | B2* | 8/2014 | Lee | G06Q 20/3278 705/14.38 |
| 2006/0163349 | A1* | 7/2006 | Neugebauer | G06Q 20/387 235/383 |
| 2007/0040654 | A1* | 2/2007 | Lee | G07C 9/00103 340/10.1 |
| 2007/0251993 | A1* | 11/2007 | Masuta | G06K 17/00 235/380 |
| 2008/0046331 | A1* | 2/2008 | Rand | G06Q 30/00 705/26.81 |

(Continued)

FOREIGN PATENT DOCUMENTS

| GB | 2503961 A | 1/2014 |
|---|---|---|
| JP | 10-105832 A | 4/1998 |

(Continued)

*Primary Examiner* — Tonya Joseph

(57) ABSTRACT

An electronic shelf label system may include: a near field communications (NFC) card apparatus including an NFC chip having an identification (ID) and performing purchasing reservation through NFC communications; a plurality of electronic tags each including an NFC chip and wirelessly transmitting purchasing reservation information including the identification (ID) of the NFC card apparatus and product information when the purchasing reservation from the NFC card apparatus through the NFC communications is present; and a management apparatus providing the product information to each of the plurality of electronic tags, receiving the purchasing reservation information from the electronic tag, and managing the purchasing reservation information for each identification (ID) included in the purchasing reservation information.

11 Claims, 6 Drawing Sheets

(56) References Cited

U.S. PATENT DOCUMENTS

| | | | | |
|---|---|---|---|---|
| 2008/0146148 A1* | 6/2008 | Hulvey | ............... | H04B 5/0062 |
| | | | | 455/41.1 |
| 2009/0125442 A1* | 5/2009 | Otto | ..................... | G06Q 20/04 |
| | | | | 705/39 |
| 2010/0161434 A1* | 6/2010 | Herwig | ............... | G06Q 20/201 |
| | | | | 705/20 |
| 2010/0174599 A1* | 7/2010 | Rosenblatt | ............ | G06Q 30/02 |
| | | | | 705/14.37 |
| 2012/0310744 A1* | 12/2012 | Kim | ..................... | G06Q 30/02 |
| | | | | 705/14.65 |
| 2013/0222116 A1* | 8/2013 | Barry, III | ............... | G06Q 50/22 |
| | | | | 340/10.1 |
| 2013/0226742 A1* | 8/2013 | Johnson | ................ | G06Q 30/02 |
| | | | | 705/27.1 |
| 2014/0180940 A1* | 6/2014 | He | .................... | G06Q 30/0185 |
| | | | | 705/318 |
| 2015/0178643 A1* | 6/2015 | Park | .................. | G06Q 30/0641 |
| | | | | 705/5 |

FOREIGN PATENT DOCUMENTS

| | | |
|---|---|---|
| JP | 2002-083368 A | 3/2002 |
| JP | 2007-141150 A | 6/2007 |
| JP | 2007-172559 A | 7/2007 |
| JP | 2009-104350 A | 5/2009 |
| JP | 2011-129093 A | 6/2011 |
| JP | 2013-235613 A | 11/2013 |
| KR | 10-2013-0060756 A | 6/2013 |
| KR | 10-2013-0065790 A | 6/2013 |

* cited by examiner

ELECTRONIC SHELF LABEL SYSTEM AND COMMUNICATIONS METHOD THEREOF

CROSS-REFERENCE TO RELATED APPLICATION

This application claims the benefit of Korean Patent Application No. 10-2013-0160632 filed on Dec. 20, 2013, with the Korean Intellectual Property Office, the disclosure of which is incorporated herein by reference.

BACKGROUND

The present disclosure relates to an electronic shelf label system and a communications method thereof.

Traditionally, a paper tag scheme displaying price information in which information is directly hand written on a tag or printed thereon by a printer has been used as a scheme of displaying product information for customers on product display stands. However, such a paper tag scheme has disadvantages, in that paper tags should be replaced whenever price information of merchandise items is changed or the positions of displayed merchandise items are changed.

Research into and development of an electronic tag scheme capable of making up for the disadvantages of a paper tag scheme as described above has been conducted. Recently, an electronic tag scheme has been limitedly applied to some product display stands. Such an electronic tag scheme is known as an electronic shelf label (ESL) system.

Generally, an electronic shelf label (ESL) system may be installed on product display stands and display, while allowing for changes in, product information.

The electronic shelf label system may include an upper server, a plurality of gateways connected to one upper server in a wired scheme, and a plurality of electronic tag groups connected to the plurality of gateways, respectively, in a wireless scheme.

The upper server may provide the product information including the price information to each of the plurality of gateways by wired communications.

Each of the plurality of gateways may transmit the product information received from the upper server to a corresponding electronic tag group by wireless communications.

Here, the corresponding electronic tag group may receive the product information by the wireless communications and display the price information included in the product information on a displaying unit.

The electronic shelf label system as described above may automatically update the product information and rapidly change the product information, in a wireless communications scheme.

Recently, as a near field communications (NFC) chip has been applied to portable terminals such as smartphones, research into and development of applications in which an NFC chip is also mounted in the electronic tag to perform NFC communications with the NFC chip of the portable terminal, thereby transmitting and receiving buying product information between the electronic tag and the portable terminal, have been conducted.

However, since the NFC chip is not mounted in all smartphones and it is still difficult to secure compatibility with the NFC chip, particularly in the case in which the NFC chip is mounted in the smartphone, a method of allowing all customers to buy merchandise items using NFC communications regardless of whether or not a NFC chip is mounted in a smartphone has been required in a store selling the merchandise items.

The following Related Art Document (Patent Document 1), which relates to an ESL system and a method of confirming product information and paying for a product, does not disclose a technical feature in which all customers may use NFC communications at the time of buying merchandise items regardless of whether or not an NFC chip is embedded in a user terminal such as a smartphone, or the like, in a store selling merchandise items.

RELATED ART DOCUMENT (Patent Document 1) Korean Patent Laid-Open Publication No. 2013-0060756

SUMMARY

An aspect of the present disclosure may provide an electronic shelf label system capable of allowing customers to use NFC communications at the time of purchasing merchandise items regardless of whether or not an NFC chip is embedded in a user terminal such as a smartphone, or the like, in a store selling the merchandise items, and a communications method thereof.

According to an aspect of the present disclosure, an electronic shelf label system may include: a near field communications (NFC) card apparatus including an NFC chip having an identification (ID) and performing purchasing reservation through NFC communications; a plurality of electronic tags each including an NFC chip and wirelessly transmitting purchasing reservation information including the identification (ID) of the NFC card apparatus and product information when the purchasing reservation from the NFC card apparatus through the NFC communications is present; and a management apparatus providing the product information to each of the plurality of electronic tags, receiving the purchasing reservation information from the electronic tag, and managing the purchasing reservation information for each identification (ID) included in the purchasing reservation information.

The management apparatus may compare a pre-registered identification (ID) and the identification (ID) included in the purchasing reservation information with each other and store the purchasing reservation information for each identification (ID) in the case in which they coincide with each other.

The management apparatus may include: a server controlling transmission of the product information to each of the plurality of electronic tags and managing the purchasing reservation information for each identification; and a gateway connected to the server through a wired network to wirelessly transmit information from the server to a corresponding electronic tag and provide the purchasing reservation information transmitted from each of the plurality of electronic tags to the server.

According to another aspect of the present disclosure, an electronic shelf label system may include: an NFC card apparatus including an NFC chip having an identification (ID) and performing purchasing reservation through NFC communications; plurality of electronic tags each including an NFC chip and wirelessly transmitting purchasing reservation information including the identification (ID) of the NFC card apparatus and product information when the purchasing reservation from the NFC card apparatus through the NFC communications is present; a management apparatus providing the product information to each of the plurality of electronic tags, receiving the purchasing reservation information from the electronic tag, and managing the purchasing reservation information for each identification (ID) included in the purchasing reservation information; and a payment apparatus managing the purchasing reservation information from the management apparatus for each identification (ID) and paying for a product for each identification (ID).

The management apparatus may compare a pre-registered identification (ID) and the identification (ID) included in the purchasing reservation information with each other and provide the purchasing reservation information for each identification (ID) to the payment apparatus in the case in which they coincide with each other.

The management apparatus may include: a server controlling transmission of the product information to each of the plurality of electronic tags and managing the purchasing reservation information for each identification; and a gateway connected to the server through a wired network to wirelessly transmit information from the server to a corresponding electronic tag and provide the purchasing reservation information transmitted from each of the plurality of electronic tags to the server.

The payment apparatus may transmit corresponding purchasing reservation information to a terminal making a request when an identification (ID) presented at the time of making the request and an internal identification (ID) coincide with each other, in the case in which the purchasing reservation information is requested.

According to another aspect of the present disclosure, a communications method of an electronic shelf label system may include: receiving, by each of a plurality of electronic tags, a request for purchasing reservation from an NFC card apparatus through NFC communications; recognizing an identification (ID) of the NFC card apparatus and wirelessly transmitting purchasing reservation information including the identification (ID) and product information to a management apparatus, at the time of receiving the request for the purchasing reservation; and receiving, by the management apparatus, the purchasing reservation information from the electronic tag and managing the purchasing reservation information for each identification (ID) included in the purchasing reservation information.

In the managing of the purchasing reservation information, the management apparatus may compare a pre-registered identification (ID) and the identification (ID) included in the purchasing reservation information with each other and store the purchasing reservation information for each identification (ID) in the case in which they coincide with each other.

The managing of the purchasing reservation information may include: providing, by a gateway of the management apparatus, the purchasing reservation information wirelessly transmitted from each of the plurality of electronic tags to a server of the management apparatus; and managing, by the server, the purchasing reservation information transmitted from the gateway for each identification (ID).

In the managing of the purchasing reservation information, the server may compare a pre-registered identification (ID) and the identification (ID) included in the purchasing reservation information with each other and transmit the purchasing reservation information for each identification (ID) to a payment apparatus in the case in which they coincide with each other.

According to another aspect of the present disclosure, a communications method of an electronic shelf label system may include: receiving, by each of a plurality of electronic tags, a request for purchasing reservation from an NFC card apparatus through NFC communications; recognizing an identification (ID) of the NFC card apparatus and wirelessly transmitting purchasing reservation information including the identification (ID) and product information to a management apparatus, at the time of receiving the request for the purchasing reservation; receiving, by the management apparatus, the purchasing reservation information from the electronic tag, storing the purchasing reservation information for each identification (ID) included in the purchasing reservation information, and transmitting the purchasing reservation information for each identification (ID) to a payment apparatus; and receiving, by the payment apparatus, the purchasing reservation information from the management apparatus, and paying for a product for each identification (ID).

In the managing of the purchasing reservation information, the management apparatus may compare a pre-registered identification (ID) and the identification (ID) included in the purchasing reservation information with each other and store the purchasing reservation information for each identification (ID) in the case in which they coincide with each other.

The managing of the purchasing reservation information may include: providing, by a gateway of the management apparatus, the purchasing reservation information wirelessly transmitted from each of the plurality of electronic tags to a server of the management apparatus; and managing, by the server, the purchasing reservation information transmitted from the gateway for each identification (ID).

In the managing of the purchasing reservation information, the server may compare a pre-registered identification (ID) and the identification (ID) included in the purchasing reservation information with each other and transmit the purchasing reservation information for each identification (ID) to the payment apparatus in the case in which they coincide with each other.

According to another aspect of the present disclosure, a communications method of an electronic shelf label system may include: receiving, by each of a plurality of electronic tags, a request for purchasing reservation from an NFC card apparatus through NFC communications; recognizing an identification (ID) of the NFC card apparatus and wirelessly transmitting purchasing reservation information including the identification (ID) and product information to a gateway, at the time of receiving the request for the purchasing reservation; transferring, by the gateway, the purchasing reservation information to a server; storing, by the server, the purchasing reservation information, and transmitting the purchasing reservation information to a payment apparatus, when the identification (ID) included in the purchasing reservation information from the gateway and a pre-registered ID coincide with each other; and receiving, by the payment apparatus, the purchasing reservation information from the management apparatus, and paying for a product for each identification (ID).

In the paying for the product, the payment apparatus may compare an identification (ID) presented at the time of making a request and an internal identification (ID) with each other and provide purchasing reservation information corresponding to the identification (ID) coinciding with the internal identification (ID) to a user terminal, in the case in which the purchasing reservation information is requested from the user terminal.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
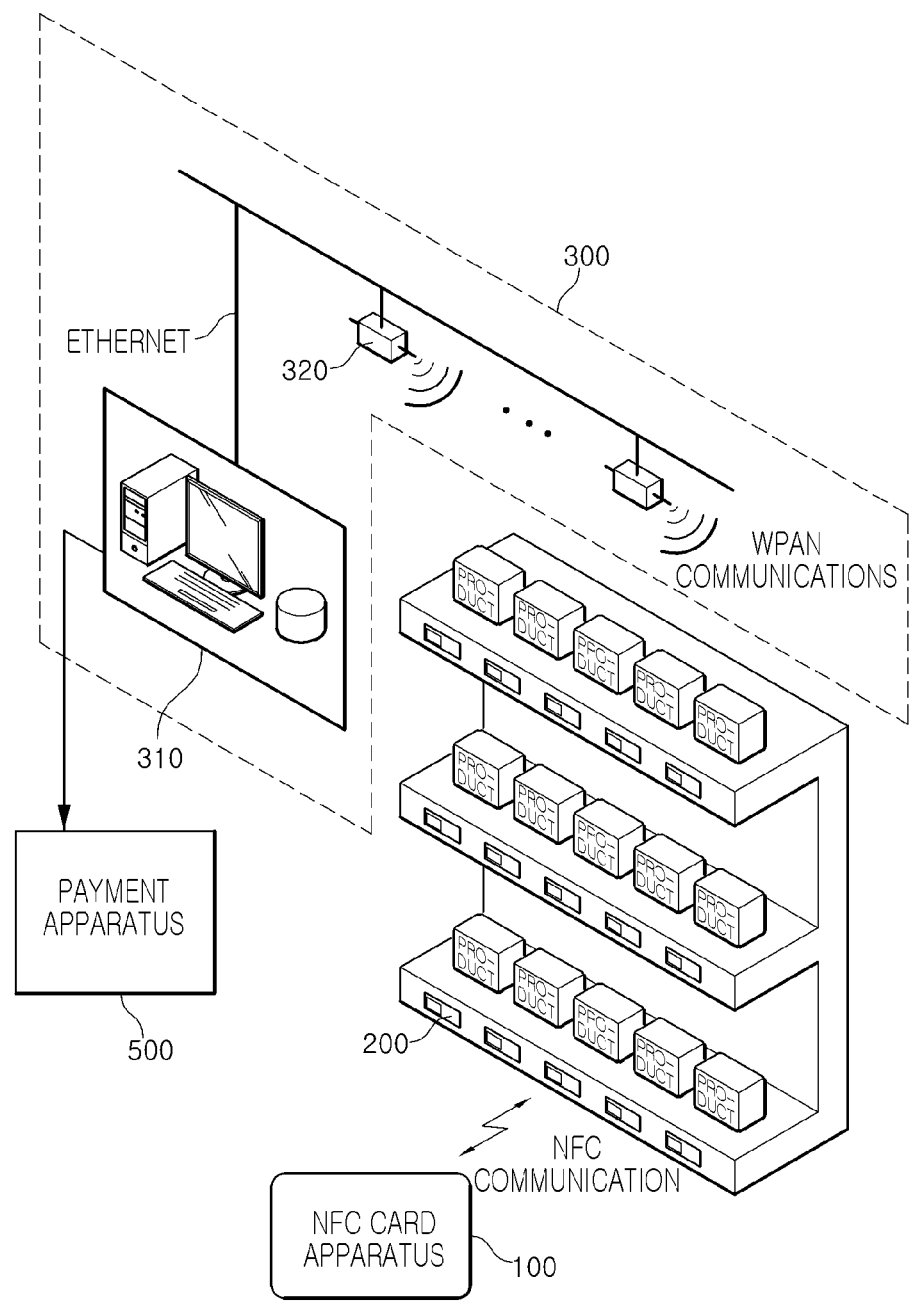
FIG. 1 is a block diagram illustrating a configuration of an electronic shelf label system according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 2:
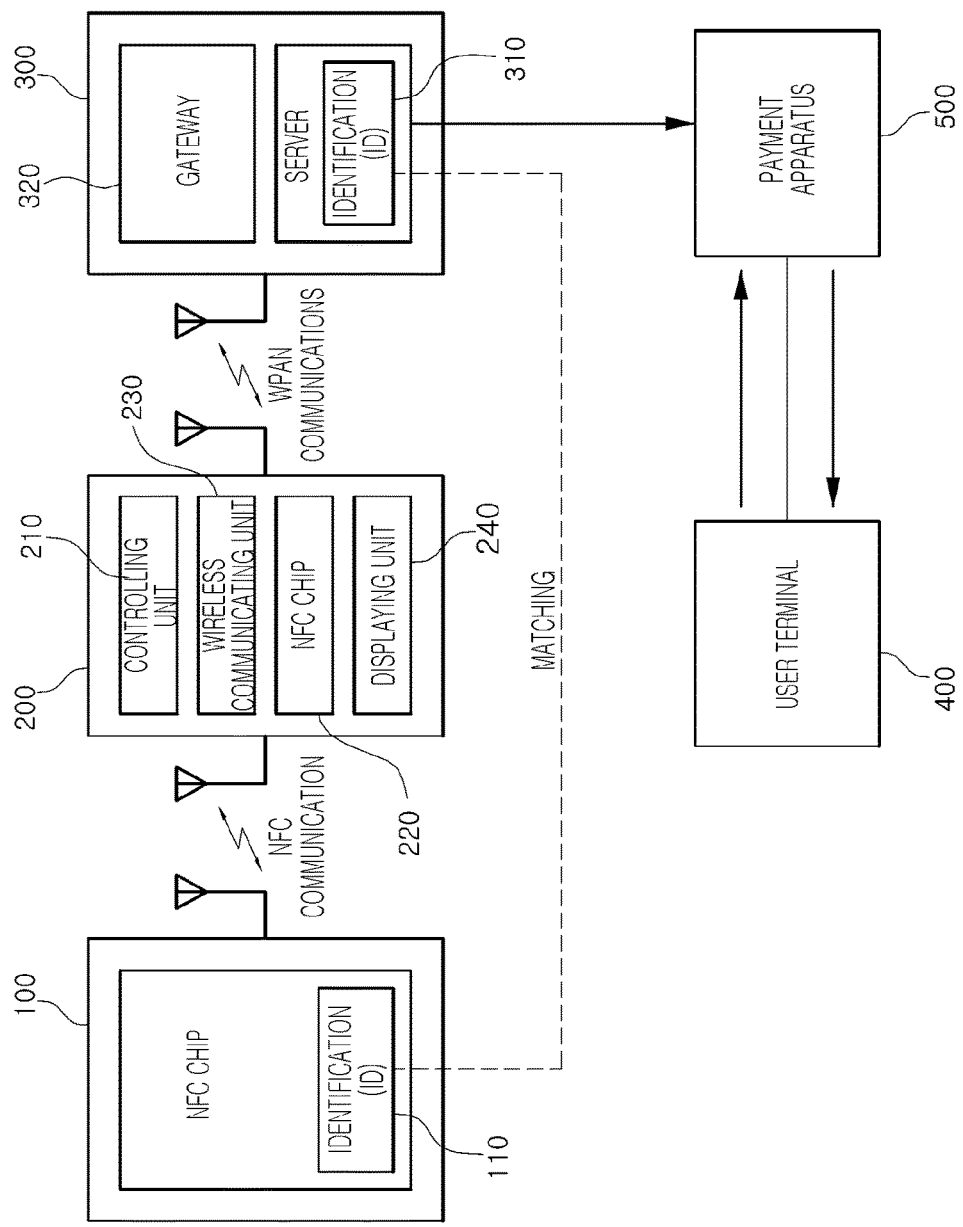
FIG. 2 is a block diagram illustrating an internal configuration of the electronic shelf label system according to an exemplary embodiment of the present disclosure.

FIG. 1 is a block diagram illustrating a configuration of an electronic shelf label system according to an exemplary embodiment of the present disclosure; and FIG. 2 is a block diagram illustrating an internal configuration of the electronic shelf label system according to an exemplary embodiment of the present disclosure.

Referring to FIGS. 1 and 2, an electronic shelf label system according to an exemplary embodiment of the present disclosure may include a near field communications (NFC) card apparatus 100, a plurality of electronic tags 200, and a management apparatus 300.

In addition, the electronic shelf label system according to an exemplary embodiment of the present disclosure may further include a payment apparatus 500.

The NFC card apparatus 100 may include an NFC chip 110 having an identification (ID) and perform purchasing reservation through NFC communications.

Referring to FIG. 2, the NFC chip 110 may be connected to an NFC antenna to perform the NFC communications. For example, the NFC chip 110 may provide the identification (ID) stored therein through the NFC communications using the NFC antenna.

Meanwhile, an appearance of the NFC card apparatus according to an exemplary embodiment of the present disclosure may have a card shape or have other shapes such as a key ring shape, and the like. However, an appearance of the NFC card apparatus according to an exemplary embodiment of the present disclosure is not limited to having the above-mentioned shapes, but may have any shape as long as the NFC card apparatus has a NFC function.

Each of the plurality of electronic tags 200 may include an NFC chip 220 and may wirelessly transmit purchasing reservation information (BRI) including the identification (ID) of the NFC card apparatus 100 and product information to the management apparatus 300 when the purchasing reservation from the NFC card apparatus 100 through the NFC communications is present.

For example, the NFC card apparatus may be a passive type that does not include a battery or be an active type that includes a battery. Here, in the case in which the NFC card apparatus is the passive type, the NFC chip of the electronic tag may be an active type. Unlike this, in the case in which the NFC card apparatus is the active type, the NFC chip of the electronic tag may be a passive type or an active type.

Meanwhile, each of the plurality of electronic tags 200 may include a controlling unit 210, a wireless communicating unit 230, and a displaying unit 240. The controlling unit 210 may serve to generally control an operation of a corresponding electronic tag. For example, the controlling unit 210 may control NFC communications, wireless communications, and a screen displaying operation.

The wireless communicating unit 230 may perform wireless communications with the management apparatus 300 depending on a control of the controlling unit 210. For example, the wireless communicating unit 230 may perform wireless personal area network (WPAN) communications according to the IEEE 802.15.4 standard.

In addition, the displaying unit 240 may display the product information on a screen depending on a control of the controlling unit 210. Here, the product information may include a product name, a producing center, a producer, a producing date, price information, and the like, but is not limited thereto.

The management apparatus 300 may provide the product information to each of the plurality of electronic tags 200, receive the purchasing reservation information (BRI) from the electronic tag 200, and manage the purchasing reservation information (BRI) for each identification (ID) included in the purchasing reservation information (BRI).

For example, the management apparatus 300 may compare a pre-registered identification (ID) and the identification (ID) included in the purchasing reservation information (BRI) with each other, and may store the purchasing reservation information (BRI) for each identification (ID) in the case in which they coincide with each other and may not recognize the purchasing reservation information (BRI) as normal purchasing reservation information (BRI) and may not store the purchasing reservation information (BRI) for each identification (ID) in the case in which they do not coincide with each other.

Referring to FIG. 2, the management apparatus 300 may include a server 310 and a gateway 320.

For example, the server 310 may control transmission of the product information to each of the plurality of electronic tags 200 and may manage the purchasing reservation information (BRI) transferred through the gateway 320 for each identification (ID).

The gateway 320 may be connected to the server 310 through a wired network such as Ethernet, or the like, to wirelessly transmit information from the server 310 to a corresponding electronic tag 200 and provide the purchasing reservation information (BRI) transmitted from each of the plurality of electronic tags to the server 310.

For example, the gateway 320 may be a gateway performing wireless personal area network (WPAN) communications according to the IEEE 802.15.4 standard with the plurality of electronic tags 200.

Meanwhile, the payment apparatus 500 may manage the purchasing reservation information (BRI) from the management apparatus 300 for each identification (ID) and pay for a product for each identification (ID).

For example, the payment apparatus 500 may be installed in a counter and store the purchasing reservation information (BRI) transmitted from the server 310 for each identification (ID).

In addition, the management apparatus 300 may compare the pre-registered identification (ID) and the identification (ID) included in the purchasing reservation information (BRI) with each other, and may provide the purchasing reservation information (BRI) for each identification (ID) to the payment apparatus 500 in the case in which they coincide with each other.

Figure 3:
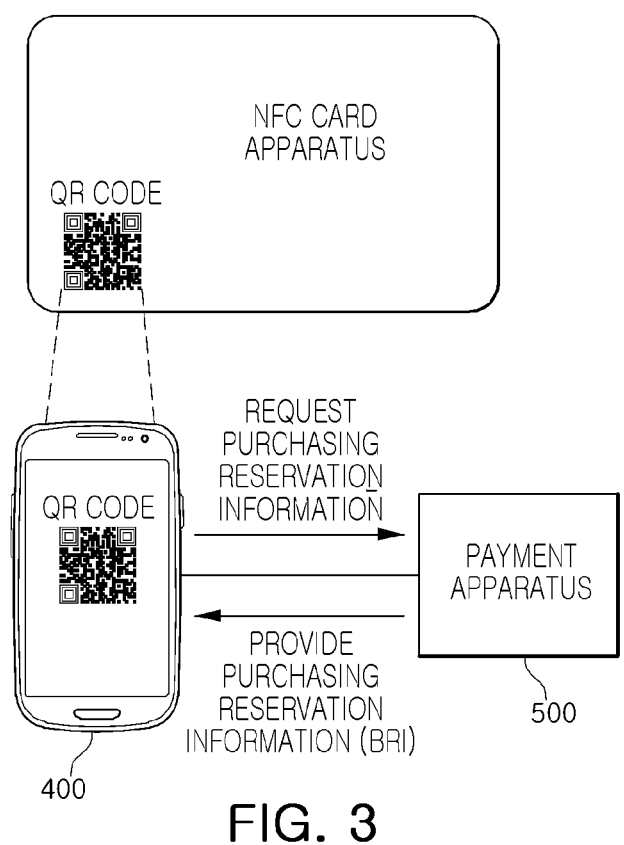
FIG. 3 is a diagram illustrating the use of a quick response (QR) code in the electronic shelf label system according to an exemplary embodiment of the present disclosure.

FIG. 3 is a diagram illustrating the use of a quick response (QR) code in the electronic shelf label system according to an exemplary embodiment of the present disclosure.

Referring to FIG. 3, the NFC card apparatus 100 of the electronic shelf label system according to an exemplary embodiment of the present disclosure may include its QR code, which includes the identification (ID).

Therefore, when a user terminal 400 scans the QR code of the NFC card apparatus 100 through a QR code scan application, or the like, it may recognize the identification (ID) of the QR code.

The user terminal 400 may request the purchasing reservation information to the payment apparatus 500 using the recognized identification (ID).

In this case, the payment apparatus 500 may provide the purchasing reservation information corresponding to a corresponding identification (ID) to the user terminal 400 depending on the request of the user terminal 400.

Here, in the case in which the payment apparatus 500 allows a web-based Internet access, the purchasing reservation information may be easily requested and utilized in a web based Internet environment of the user terminal 400.

For example, the payment apparatus 500 may provide the corresponding purchasing reservation information (BRI) to the user terminal making the request when an identification (ID) presented at the time of making the request and an internal identification (ID) coincide with each other, in the case in which the purchasing reservation information is requested by the user terminal 400, or the like, as described above.

Figure 4:
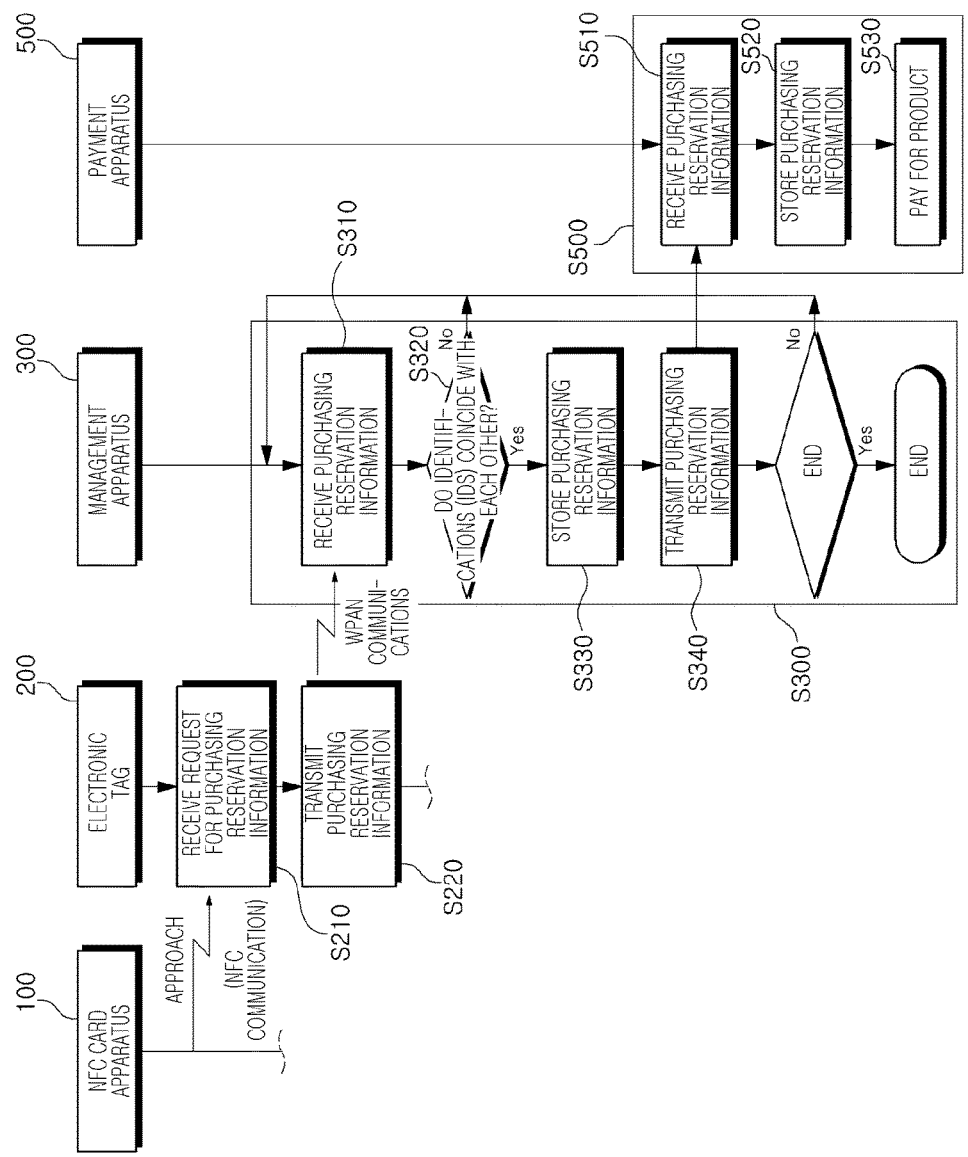
FIG. 4 is a flow chart illustrating a communications method of an electronic shelf label system according to an exemplary embodiment of the present disclosure.
Figure 5:
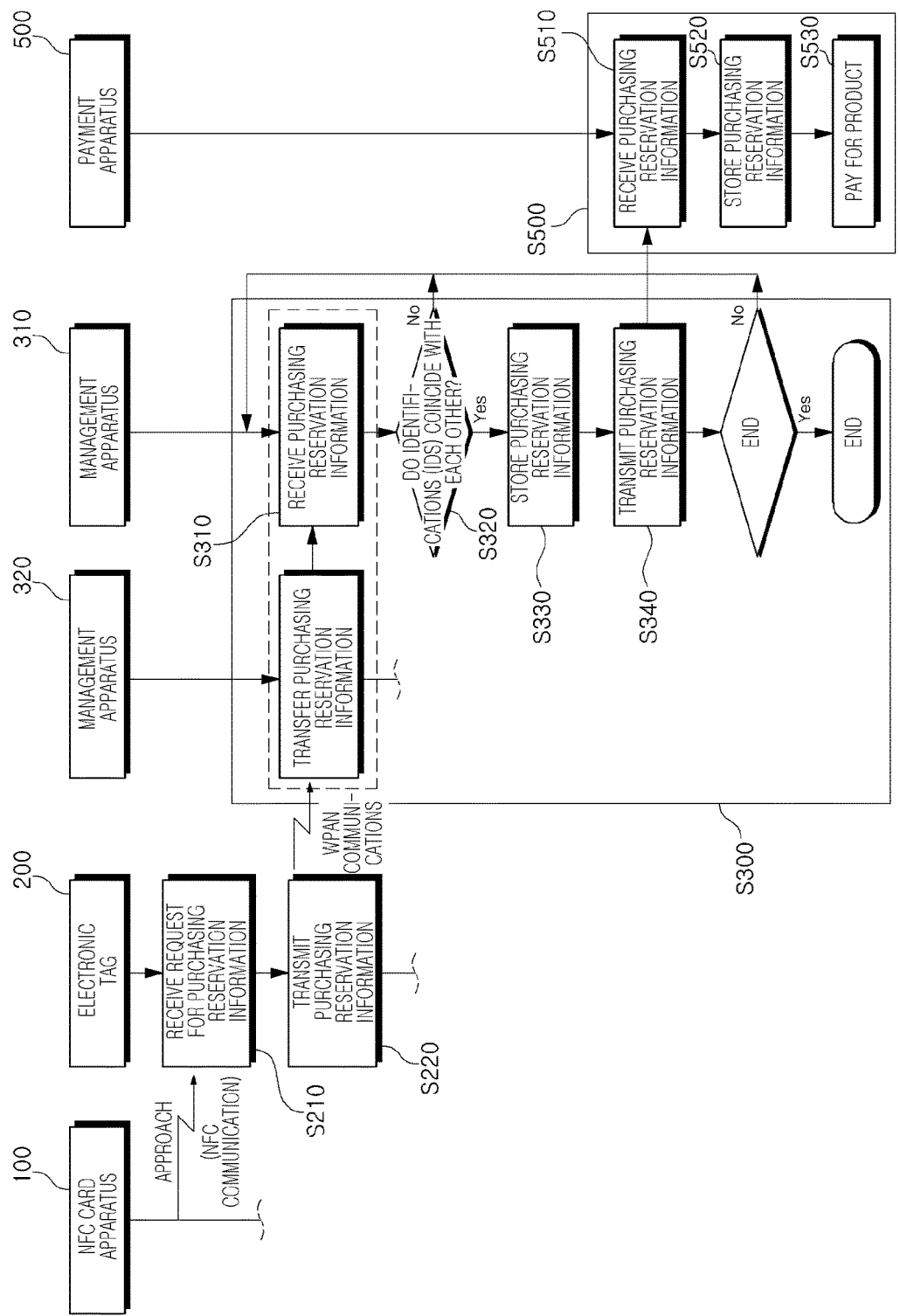
FIG. 5 is a flow chart illustrating a communications method of an electronic shelf label system according to an exemplary embodiment of the present disclosure.

FIG. 4 is a flow chart illustrating a communications method of an electronic shelf label system according to an exemplary embodiment of the present disclosure; and FIG. 5 is a flow chart illustrating a communications method of an electronic shelf label system according to an exemplary embodiment of the present disclosure.

A communications method of an electronic shelf label system according to an exemplary embodiment of the present disclosure will be described with reference to FIGS. 1 through 6.

Here, in describing the communications method of an electronic shelf label system according to an exemplary embodiment of the present disclosure, an operation description made with reference to FIGS. 1 through 3 may be applied as it is. Therefore, an overlapped detailed description will be omitted in describing the communications method of an electronic shelf label system.

Referring to FIGS. 4 and 5, in S210, each of the plurality of electronic tags 200 may receive a request for the purchasing reservation from the NFC card apparatus 100 through the NFC communications.

For example, when the NFC card apparatus 100 including the NFC chip 110 approaches the corresponding electronic tag 200, the NFC chip 110 of the NFC card apparatus 100 may transmit the identification (ID), and the NFC chip 220 of the electronic tag 200 may recognize the identification (ID).

Next, in S220, the electronic tag 200 may recognize the identification (ID) of the NFC card apparatus 100 and wirelessly transmit the purchasing reservation information (BRI) including the identification (ID) and the product information to the management apparatus 300, at the time of receiving the request for the purchasing reservation.

Next, in S300, the management apparatus 300 may receive the purchasing reservation information (BRI) from the electronic tag 200 and manage the purchasing reservation information (BRI) for each identification (ID) included in the purchasing reservation information (BRI).

For example, in S300, the management apparatus 300 may compare the pre-registered identification (ID) and the identification (ID) included in the purchasing reservation information (BRI) with each other, and may store the purchasing reservation information (BRI) for each identification (ID) in the case in which they coincide with each other.

S300 will be described with reference to FIG. 5.

First, the gateway 320 of the management apparatus 300 may provide the purchasing reservation information (BRI) wirelessly transmitted from each of the plurality of electronic tags 200 to the server 310 of the management apparatus 300. Here, the server 310 may receive the purchasing reservation information (BRI) transmitted from the gateway 320 (S310).

Then, the server 310 may compare the pre-registered identification (ID) and the identification (ID) included in the purchasing reservation information (BRI) with each other (S320).

Here, in the case in which the pre-registered identification (ID) and the identification (ID) included in the purchasing reservation information (BRI) coincide with each other, the server 310 may store the purchasing reservation information (BRI) for each identification (ID) (S330), and may transmit the purchasing reservation information (BRI) to the payment apparatus 500 (S340).

Figure 6:
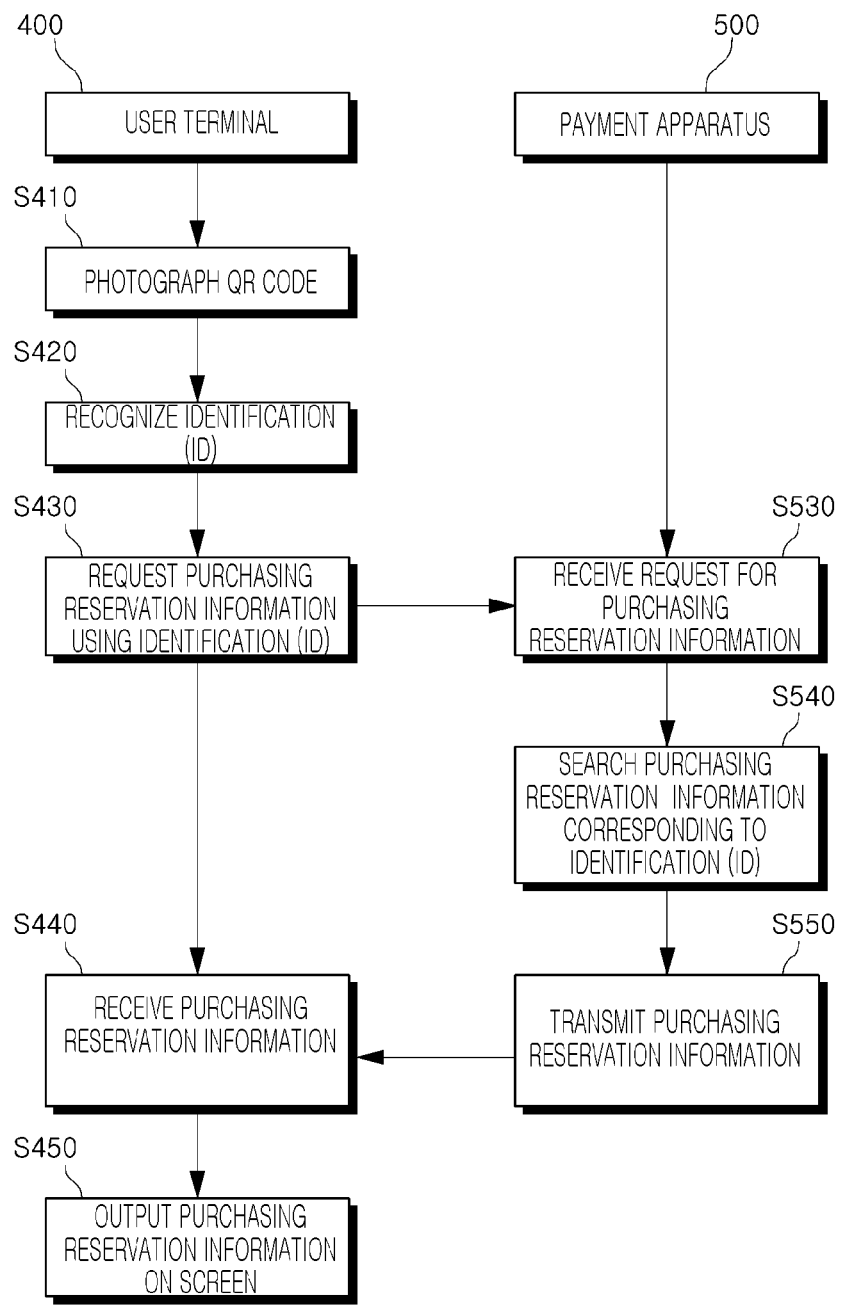
FIG. 6 is a diagram illustrating procedures of requesting and providing purchasing reservation information of an electronic shelf label system according to an exemplary embodiment of the present disclosure.

FIG. 6 is a diagram illustrating procedures of requesting and providing purchasing reservation information of an electronic shelf label system according to an exemplary embodiment of the present disclosure.

Referring to FIG. 6, the NFC card apparatus 100 of the electronic shelf label system according to an exemplary embodiment of the present disclosure may include its QR code, which includes the identification (ID).

Therefore, when the user terminal 400 scans the QR code of the NFC card apparatus 100 through the QR code scan application, or the like, it may recognize the identification (ID) of the QR code (S410 and S420).

Next, the user terminal 400 may request the purchasing reservation information to the payment apparatus 500 using the recognized identification (ID) (S430).

In this case, when the payment apparatus 500 receives the request of the user terminal 400, the payment apparatus 500 may search the purchasing reservation information corresponding to the corresponding identification (ID) depending on the request of the user terminal 400 and provide the searched purchasing reservation information to the user terminal 400 (S530, S540, and S550).

Then, the user terminal 400 may receive the purchasing reservation information from the payment apparatus 500, store the purchasing reservation information, and output the purchasing reservation information on a screen (S440 and S450).

Here, in the case in which the payment apparatus 500 allows the web-based Internet access, the purchasing reservation information may be easily requested and utilized in the web based Internet environment of the user terminal 400.

According to an exemplary embodiment of the present disclosure as described above, product purchasing reservation and payment may be easily performed using the NFC card apparatus provided in a store without the smartphone in which the NFC chip is mounted.

As set forth above, according to exemplary embodiments of the present disclosure, all customers may use NFC communications at the time of buying merchandise items regardless of whether or not an NFC chip is embedded in a user terminal such as a smartphone, or the like, in a store selling the merchandise items.

While exemplary embodiments have been shown and described above, it will be apparent to those skilled in the art that modifications and variations could be made without departing from the spirit and scope of the present disclosure as defined by the appended claims.

What is claimed is:

1. An electronic shelf label system comprising:
a near field communication (NFC) card apparatus including an NFC chip having an identification (ID) and configured to perform purchasing reservation through NFC;
a plurality of electronic tags each including an NFC chip and configured to wirelessly transmit purchasing reservation information including the identification (ID) of the NFC card apparatus and product information when the purchasing reservation from the NFC card apparatus is performed through the NFC; and
a management apparatus configured to provide the product information to each of the plurality of electronic tags, to receive the purchasing reservation information from the electronic tags, and to manage the purchasing reservation information for each identification (ID) included in the purchasing reservation information, and
a payment apparatus configured to manage the purchasing reservation information from the management apparatus for each identification (ID) and used to pay for a product for each identification (ID),
wherein the management apparatus is configured to compare an internal identification (ID) with the identification (ID) included in the purchasing reservation information and, when they coincide with each other, the management apparatus is configured to store the purchasing reservation information for each identification (ID),
wherein the NFC card apparatus includes a quick response (QR) code, which includes the identification (ID),
wherein the payment apparatus is configured to transmit corresponding purchasing reservation information to a user terminal which is configured to scan the QR code of the NFC card apparatus through a quick response (QR) code scan application and makes a request when an identification (ID) presented at the time of making the request and an internal identification (ID) coincide with each other, in the case in which the purchasing reservation information is requested by the user terminal.

2. The electronic shelf label system of claim 1, wherein the management apparatus includes:
a server configured to control transmission of the product information to each of the plurality of electronic tags and to manage the purchasing reservation information for each identification; and
a gateway connected to the server through a wired network to wirelessly transmit information from the server to a corresponding electronic tag and to provide the purchasing reservation information transmitted from each of the plurality of electronic tags to the server.

3. An electronic shelf label system comprising:
a near field communication (NFC) card apparatus including an NFC chip having an identification (ID) and configured to perform purchasing reservation through NFC;
plurality of electronic tags each including an NFC chip and configured to wirelessly transmit purchasing reservation information including the identification (ID) of the NFC card apparatus and product information when the purchasing reservation from the NFC card apparatus through the NFC is present;
a management apparatus configured to provide the product information to each of the plurality of electronic tags, receive the purchasing reservation information from the electronic tag, and manage the purchasing reservation information for each identification (ID) included in the purchasing reservation information; and
a payment apparatus configured to manage the purchasing reservation information from the management apparatus for each identification (ID) and to pay for a product for each identification (ID),
wherein the management apparatus is configured to compare an internal identification (ID) and the identification (ID) included in the purchasing reservation information with each other and to provide the purchasing reservation information for each identification (ID) to the payment apparatus in the case in which they coincide with each other,
wherein the NFC card apparatus includes a quick response (QR) code, which includes the identification (ID),
wherein a user terminal is configured to scan the QR code of the NFC card apparatus through a quick response (QR) code scan application and to request a purchasing reservation information based on the identification (ID) in the QR code to the payment apparatus,
wherein the payment apparatus is configured to transmit corresponding purchasing reservation information to the user terminal when the identification (ID) presented at the time of making the request and an internal identification (ID) coincide with each other.

4. A communication method of an electronic shelf label system, comprising:
receiving, by each of a plurality of electronic tags, a request for purchasing reservation from a near field communication (NFC) card apparatus through NFC;
recognizing an identification (ID) of the NFC card apparatus and wirelessly transmitting purchasing reservation information including the identification (ID) and product information to a management apparatus, at the time of receiving the request for the purchasing reservation; and
receiving, by the management apparatus, the purchasing reservation information from the electronic tag and managing the purchasing reservation information for each identification (ID) included in the purchasing reservation information,
wherein in the managing of the purchasing reservation information, the management apparatus compares an internal identification (ID) and the identification (ID)

included in the purchasing reservation information with each other, stores the purchasing reservation information for each identification (ID) in the case in which they coincide with each other, and transmits the purchasing reservation information for each identification (ID) to a payment apparatus, wherein the payment apparatus transmits corresponding purchasing reservation information to a user terminal which scans the QR code of the NFC card apparatus through a QR code scan application and makes a request when an identification (ID) presented at the time of making the request and an internal identification (ID) coincide with each other, in the case in which the purchasing reservation information is requested from the user terminal.

5. The method of an electronic shelf label system of claim 4, wherein the managing of the purchasing reservation information includes:

providing, by a gateway of the management apparatus, the purchasing reservation information wirelessly transmitted from each of the plurality of electronic tags to a server of the management apparatus; and managing, by the server, the purchasing reservation information transmitted from the gateway for each identification (ID).

6. The method of an electronic shelf label system of claim 5, wherein in the managing of the purchasing reservation information, the server compares the internal identification (ID) and the identification (ID) included in the purchasing reservation information with each other and transmits the purchasing reservation information for each identification (ID) to the payment apparatus in the case in which they coincide with each other.

7. A communication method of an electronic shelf label system, comprising:

receiving, by each of a plurality of electronic tags, a request for purchasing reservation from a near field communication (NFC) card apparatus through NFC;

recognizing an identification (ID) of the NFC card apparatus and wirelessly transmitting purchasing reservation information including the identification (ID) and product information to a management apparatus, at the time of receiving the request for the purchasing reservation;

receiving, by the management apparatus, the purchasing reservation information from the electronic tag, storing the purchasing reservation information for each identification (ID) included in the purchasing reservation information, and transmitting the purchasing reservation information for each identification (ID) to a payment apparatus; and receiving, by the payment apparatus, the purchasing reservation information from the management apparatus, and paying for a product for each identification (ID), wherein the management apparatus compares an internal identification (ID) and the identification (ID) included in the purchasing reservation information with each other and stores the purchasing reservation information for each identification (ID) in the case in which they coincide with each other, wherein the NFC card apparatus includes a quick response (QR) code, which includes the identification (ID), wherein a user terminal scans the QR code of the NFC card apparatus through a quick response (QR) code scan application and requests a purchasing reservation information based on the identification (ID) in the QR code to the payment apparatus, wherein the payment apparatus transmits corresponding purchasing reservation information to the user terminal when the identification (ID) presented at the time of making the request and an internal identification (ID) coincide with each other.

8. The electronic shelf label system of claim 1, wherein in the case in which the NFC card apparatus is a passive type, the NFC chip of the electronic tags is an active type, and in the case in which the NFC card apparatus is an active type, the NFC chip of the electronic tags is an active type or a passive type.

9. The method of an electronic shelf label system of claim 7, wherein the managing of the purchasing reservation information includes:

providing, by a gateway of the management apparatus, the purchasing reservation information wirelessly transmitted from each of the plurality of electronic tags to a server of the management apparatus; and managing, by the server, the purchasing reservation information transmitted from the gateway for each identification (ID).

10. The method of an electronic shelf label system of claim 9, wherein in the managing of the purchasing reservation information, the server compares the internal identification (ID) and the identification (ID) included in the purchasing reservation information with each other and transmits the purchasing reservation information for each identification (ID) to the payment apparatus in the case in which they coincide with each other.

11. The method of an electronic shelf label system of claim 7, wherein in the case in which the NFC card apparatus is a passive type, the NFC chip of the electronic tags is an active type, and in the case in which the NFC card apparatus is an active type, the NFC chip of the electronic tags is an active type or a passive type.

* * * * *